(12) United States Patent
Chen

(10) Patent No.: US 10,539,291 B2
(45) Date of Patent: Jan. 21, 2020

(54) ILLUMINATION APPARATUS

(71) Applicants: LITE-ON ELECTRONICS (GUANGZHOU) LIMITED, Guangzhou (CN); Lite-On Technology Corporation, Taipei (TW)

(72) Inventor: Kuan-Yu Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 11 days.

(21) Appl. No.: 15/979,469

(22) Filed: May 15, 2018

(65) Prior Publication Data
US 2019/0257495 A1    Aug. 22, 2019

(30) Foreign Application Priority Data

Feb. 22, 2018   (CN) .......................... 2018 1 0153760

(51) Int. Cl.
| | |
|---|---|
| *F21V 5/00* | (2018.01) |
| *G02B 27/09* | (2006.01) |
| *G02B 5/02* | (2006.01) |
| *F21V 7/00* | (2006.01) |

(52) U.S. Cl.
CPC ............ *F21V 5/002* (2013.01); *F21V 7/0066* (2013.01); *G02B 5/0284* (2013.01); *G02B 27/0955* (2013.01); *G02B 27/0977* (2013.01)

(58) Field of Classification Search
None
See application file for complete search history.

(56) References Cited

U.S. PATENT DOCUMENTS

| 8,619,363 B1* | 12/2013 | Coleman | G02B 5/18 |
| | | | 359/576 |
| 9,638,853 B2* | 5/2017 | Starkey | G02B 5/0221 |
| 2005/0151119 A1* | 7/2005 | Jones | G02B 5/0226 |
| | | | 252/299.1 |
| 2012/0268940 A1* | 10/2012 | Sahlin | G02B 5/045 |
| | | | 362/290 |
| 2017/0314752 A1* | 11/2017 | Yui | E06B 9/24 |

\* cited by examiner

*Primary Examiner* — Ashok Patel
(74) *Attorney, Agent, or Firm* — JCIPRNET

(57) ABSTRACT

An illumination apparatus includes a reflective shell, a front cover, a light-emitting device, and a plurality of optical micro-structures. The front cover is connected to the reflective shell. A containing space is formed between the reflective shell and the front cover. The light-emitting device is disposed in the containing space and is configured to emit a light beam. The optical micro-structures are disposed on at least one of the reflective shell and the front cover. Each of the optical micro-structures is a multilayer stair-structure. The optical micro-structures diffuse the light beam by refraction and reflection.

19 Claims, 8 Drawing Sheets

ILLUMINATION APPARATUS

CROSS REFERENCE TO RELATED APPLICATION

This application claims the priority benefit of China application serial no. 201810153760.4, filed on Feb. 22, 2018. The entirety of the above-mentioned patent application is hereby incorporated by reference herein and made a part of specification.

BACKGROUND

Technical Field

The disclosure relates to an optical apparatus. More particularly, the disclosure relates to an illumination apparatus.

Description of Related Art

Nowadays, light-emitting diodes (LEDs) are gradually adopted as a light-emitting source for road illumination. The light-emitting diodes emit light through combining the electrons and the holes to convert electric energy into light energy rather than emit light through heating or discharging. Thus, the light-emitting diodes have advantages such as quick response speeds, small volumes, electricity saving, low pollution, and long life time and are suitable for mass production. As such, the light-emitting diodes gradually become the mainstream for illumination apparatuses.

Generally, light emitted by the light-emitting diodes is directional. When the light-emitting diodes act as the light-emitting source for road illumination devices, problems such as severe glare caused by excessive concentration of light intensity may occur most of the time, which may easily lead to uncomfortable feeling in the eyes of the pedestrians and the drivers. If matte lampshades are adopted to address the glare problem, since the light rays may disperse in all directions when being covered by the matte lampshades, the light rays may be emitted in a direction that requires no illumination. Consequently, energy waste is caused and insufficient light energy may be radiated on the road surface, and road regulations are not met as a result. Therefore, how an illumination apparatus is designed in which required illumination effect is satisfied and glare is suppressed is an important issue for research and development.

SUMMARY

The disclosure provides an illumination apparatus in which glare is suppressed and required illumination effect is achieved.

In an embodiment of the disclosure, an illumination apparatus includes a reflective shell, a front cover, a light-emitting device, and a plurality of optical micro-structures. The front cover is connected to the reflective shell. A containing space is formed between the reflective shell and the front cover. The light-emitting device is disposed in the containing space and is configured to emit a light beam. The optical micro-structures are disposed on at least one of the reflective shell and the front cover. Each of the optical micro-structures is a multilayer stair-structure. The optical micro-structures diffuse the light beam by refraction and reflection.

In another embodiment of the disclosure, an illumination apparatus includes a reflective shell, a front cover, a light-emitting device, and a plurality of optical micro-structures. The front cover is connected to the reflective shell. A containing space is formed between the reflective shell and the front cover. The light-emitting device is disposed in the containing space and is configured to emit a light beam. The optical micro-structures are disposed on at least one of the reflective shell and the front cover. Each of the optical micro-structures includes a plurality of stacked layers. At least part of side surfaces of the stacked layers are not aligned. The optical micro-structures diffuse the light beam by refraction and reflection.

To sum up, in the illumination apparatus provided by the embodiments of the disclosure, the optical micro-structures featuring the multilayer stair-structures or the optical micro-structures featuring the stacked layers with at least part of the side surfaces not being aligned are adopted. Since the optical micro-structures may diffuse the light beam by refraction and reflection, glare is suppressed and required illumination effect is achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
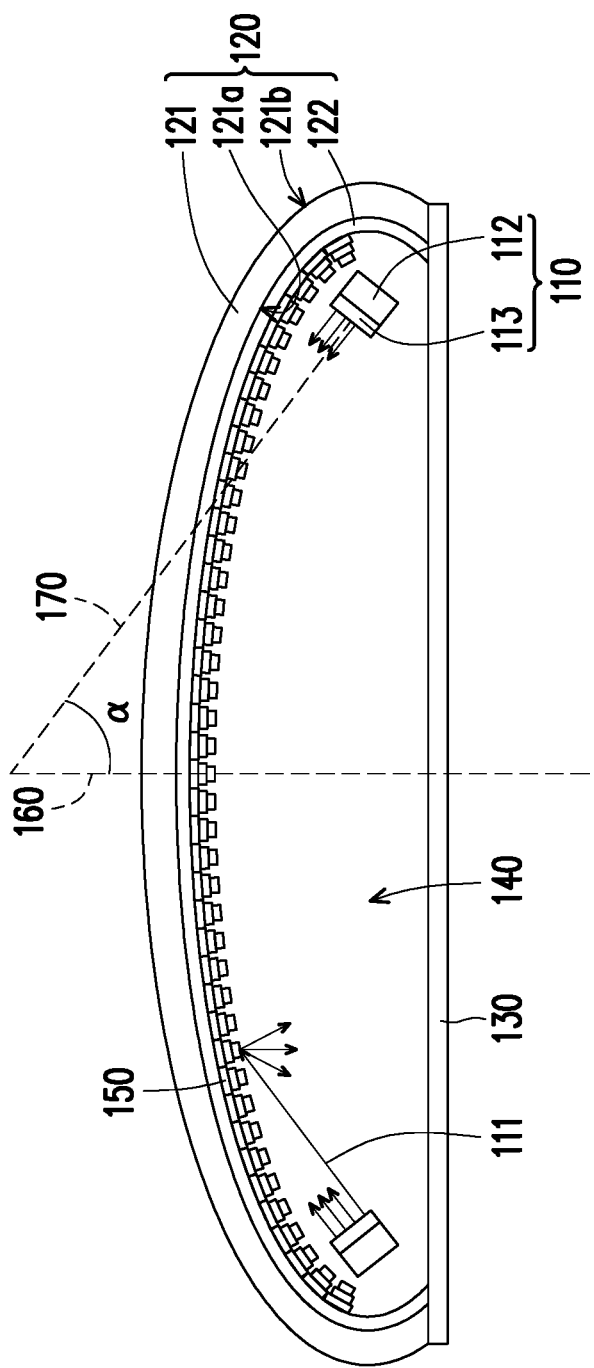
FIG. 1 is a schematic cross-sectional view of an illumination apparatus according to an embodiment of the disclosure.
Figure 2:
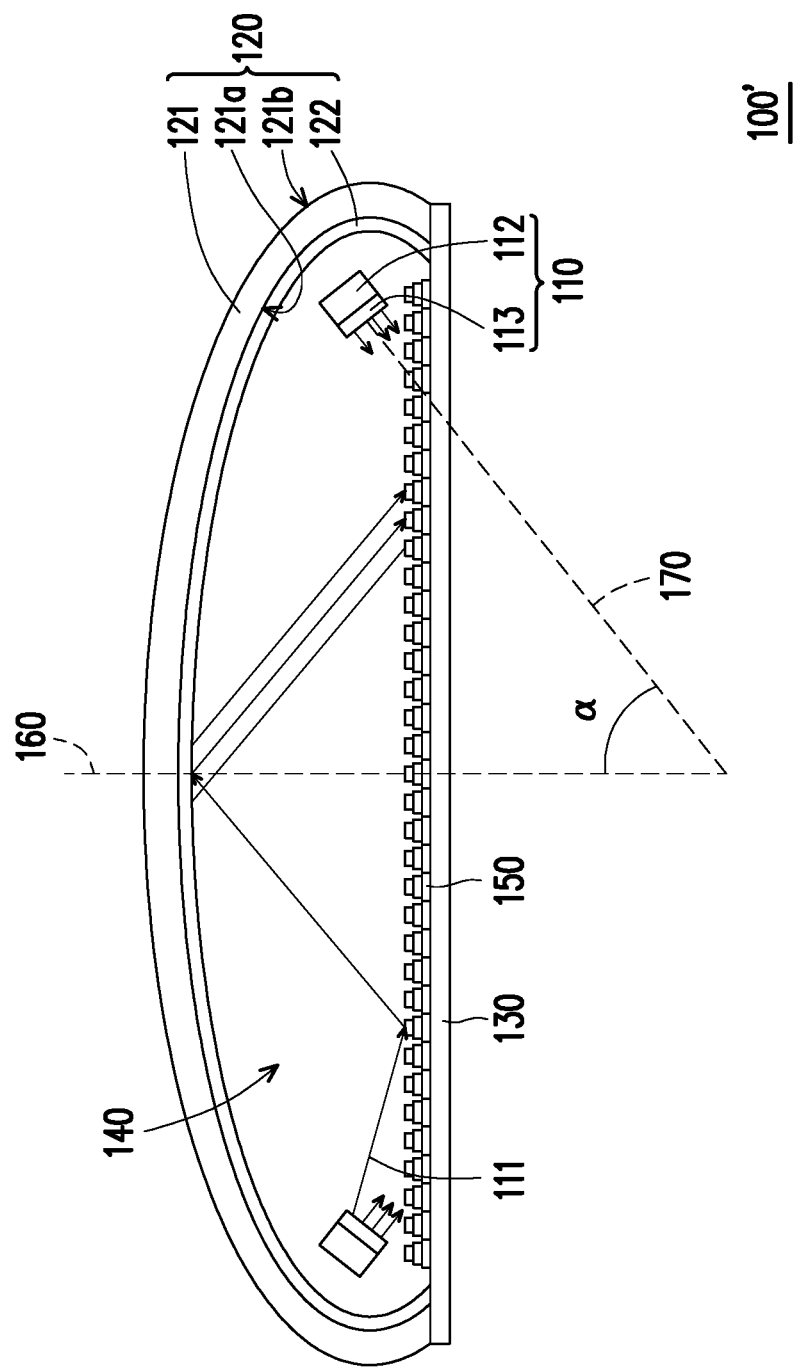
FIG. 2 is a schematic cross-sectional view of an illumination apparatus according to another embodiment of the disclosure.

FIG. 1 is a schematic cross-sectional view of an illumination apparatus according to an embodiment of the disclosure. FIG. 2 is a schematic cross-sectional view of an illumination apparatus according to another embodiment of the disclosure. With reference to FIG. 1, an illumination apparatus 100 of this embodiment includes a reflective shell 120, a front cover 130, at least one light-emitting device 110

(plural light-emitting devices 110 are taken for example in this embodiment), and a plurality of optical micro-structures 150. In some embodiments, the illumination apparatus 100 is an outdoors road illumination apparatus, such as a street light. The front cover 130 is connected to the reflective shell 120, wherein a containing space 140 is formed between the reflective shell 120 and the front cover 130. The light-emitting devices 110 are disposed in the containing space 140 and are configured to emit a light beam 111. The optical micro-structures 150 are disposed on at least one of the reflective shell 120 and the front cover 130 (being disposed on the reflective shell 120 is taken for example in the embodiment of FIG. 1). Each of the optical micro-structures 150 is a multilayer stair-structure. The optical micro-structures 150 diffuse the light beam 111 by refraction and reflection.

In this embodiment, the optical micro-structures 150 are disposed on the reflective shell 120, as shown in FIG. 1. In this way, the light beam 111 emitted by the light-emitting devices 110 faces the optical micro-structures 150. That is, the light beam 111 emitted by the light-emitting devices 110 faces the reflective shell 120. Conversely, in another embodiment, the optical micro-structures 150 of an illumination apparatus 100' are disposed on the front cover 130, as shown in FIG. 2. In this way, the light beam 111 emitted by the light-emitting devices 110 faces the optical micro-structures 150. That is, the light beam 111 emitted by the light-emitting devices 110 faces the front cover 130. Nevertheless, the disclosure should not be construed as limited thereto. The optical micro-structures 150 may also be disposed on both of the reflective shell 120 and the front cover 130. In this way, the light beam 111 emitted by the light-emitting devices 110 may be disposed to face the reflective shell 120 or the front cover 130 according to actual requirement of a light shape. In the embodiment of FIG. 1 and FIG. 2, in order to increase light diffusion effect, an included angle α between an optical axis 170 of the light-emitting device 110 and a central axis 160 of the front cover 130 ranges from 20 degrees to 80 degrees, and a height of the containing space 140 along the central axes 160 of the front cover 130 is greater than 15 millimeters.

Figure 3A:
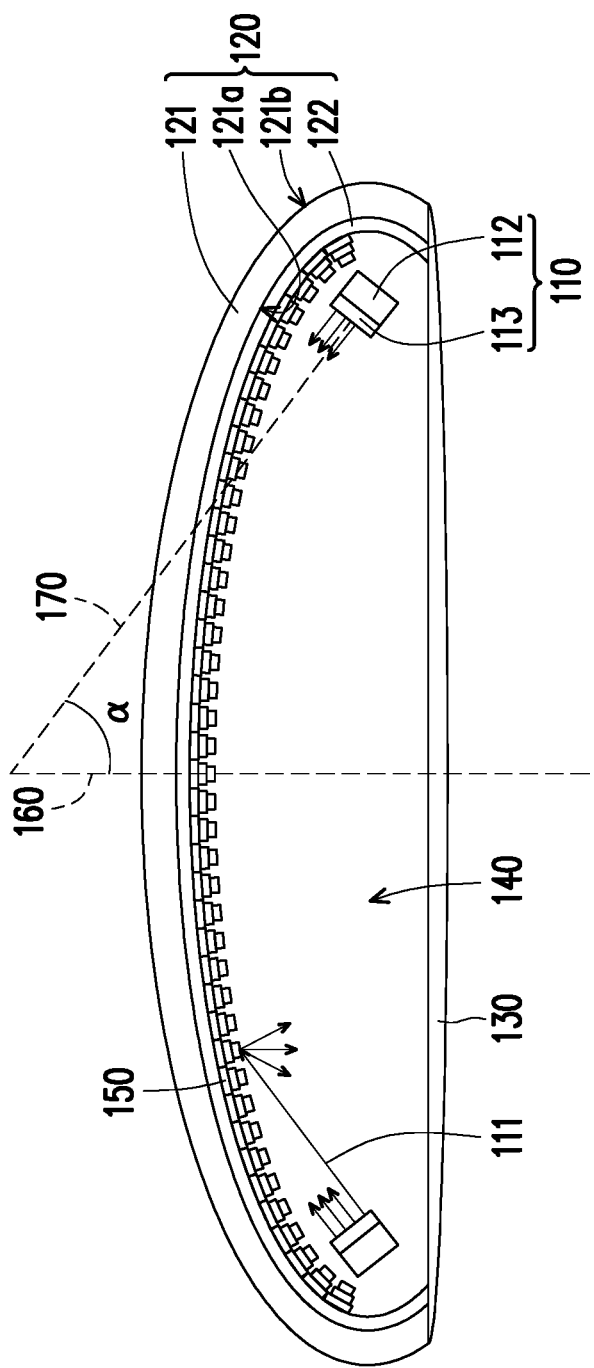
FIG. 3A is a schematic cross-sectional view of an illumination apparatus with a front cover shaped as a convex lens according to an embodiment of the disclosure.
Figure 3B:
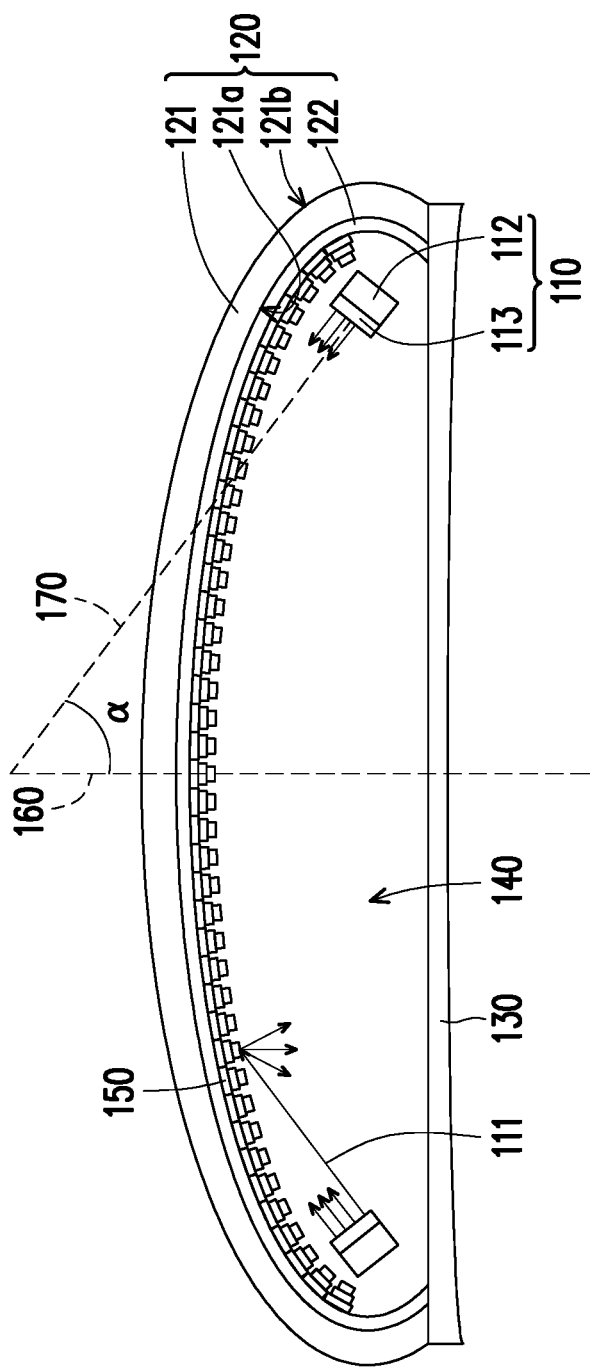
FIG. 3B is a schematic cross-sectional view of an illumination apparatus with a front cover shaped as a concave lens according to an embodiment of the disclosure.
Figure 3C:
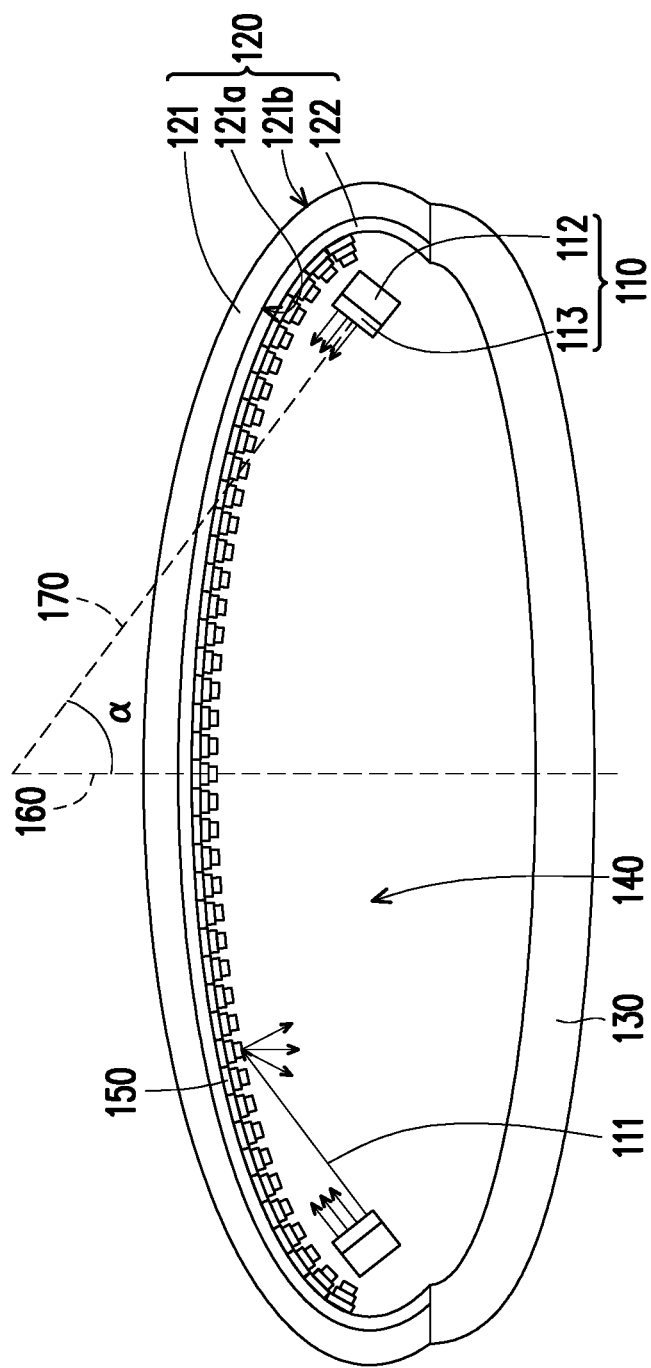
FIG. 3C is a schematic cross-sectional view of an illumination apparatus with a front cover shaped as a curved plate with a uniform thickness according to an embodiment of the disclosure.

FIG. 3A is a schematic cross-sectional view of an illumination apparatus with a front cover shaped as a convex lens according to an embodiment of the disclosure. FIG. 3B is a schematic cross-sectional view of an illumination apparatus with a front cover shaped as a concave lens according to an embodiment of the disclosure. FIG. 3C is a schematic cross-sectional view of an illumination apparatus with a front cover shaped as a curved plate with a uniform thickness according to an embodiment of the disclosure. With reference to FIG. 1, FIG. 2, FIG. 3A, FIG. 3B, and FIG. 3C together, the front cover 130 may be flat plate-shaped (as shown in FIG. 1 and FIG. 2) in this embodiment. Nevertheless, in other embodiments, the front cover 130 may also be convex lens-shaped (as shown in FIG. 3A), concave lens-shaped (as shown in FIG. 3B), or curved plate-shaped with a uniform thickness (as shown in FIG. 3C). Each of the light-emitting devices 110 includes a light-emitting diode 112 and a secondary lens 113. The light-emitting diode 112 is configured to emit the light beam 111. The secondary lens 113 is disposed on a transmission path of the light beam 111 from the light-emitting diode 112 to increase a divergence angle of the light beam 111. Besides, the reflective shell 120 includes a cover 121 and a reflection layer 122 in this embodiment. The cover 121 has an inner surface 121a facing the containing space 140 and an outer surface 121b facing away from the containing space 140. The reflection layer 122 is located on the inner surface 121a. In FIG. 1, the optical micro-structures 150 are, for example, disposed on the reflection layer 122.

In some embodiments, the optical micro-structures 150 and the reflective shell 120 are made of a transparent material. In terms of material selection, a material of the optical micro-structures 150 is, for example, poly(methyl methacrylate) (PMMA) or polycarbonate (PC), and a material of the reflective shell 120 is, for example, a polyethylene terephthalate (PET) plastic material, but the disclosure is not limited thereto. As such, the reflection layer 122 featuring reflection effect (e.g., a metal coating layer or an optical film layer with high reflectivity) may be disposed on the reflective shell 120, but the disclosure is not limited thereto. In addition, the front cover 130 may be made of a transparent material or a transparent material doped with a light-scattering material or light-scattering particles and thus may be capable of delivering light diffusion effect. Alternatively, the front cover 130 may also be made of a transparent material with an irregular surface or with a rough surface and thus may be capable of delivering light diffusion effect.

Figure 4:
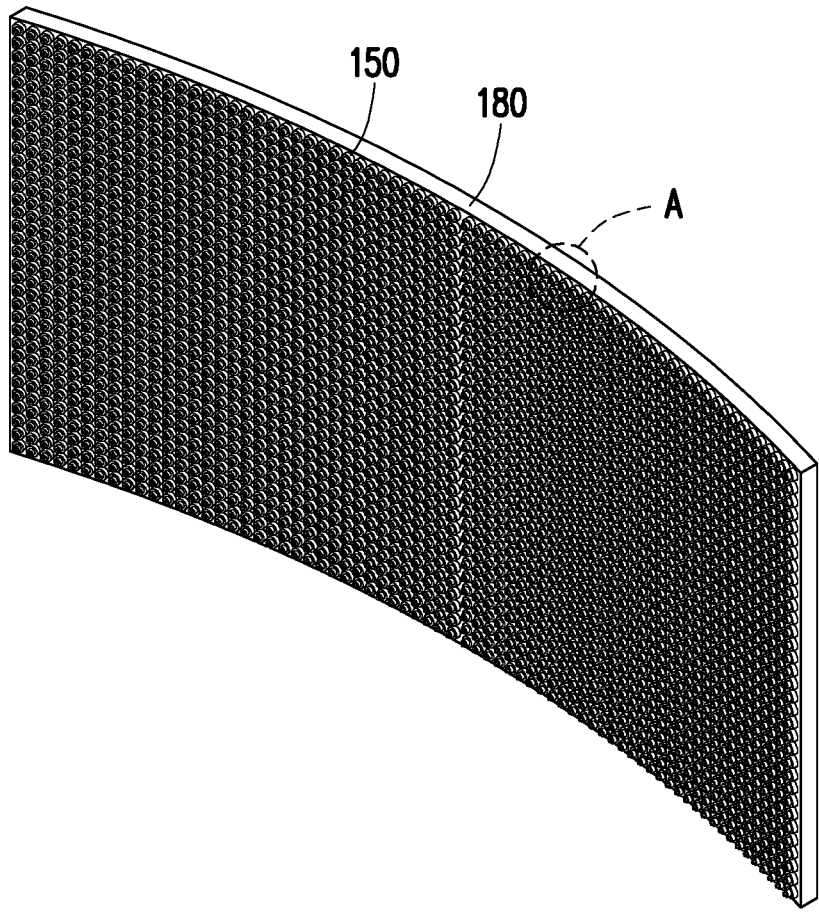
FIG. 4 is a schematic three-dimensional view illustrating the optical micro-structures in FIG. 1 and FIG. 2.
Figure 5:
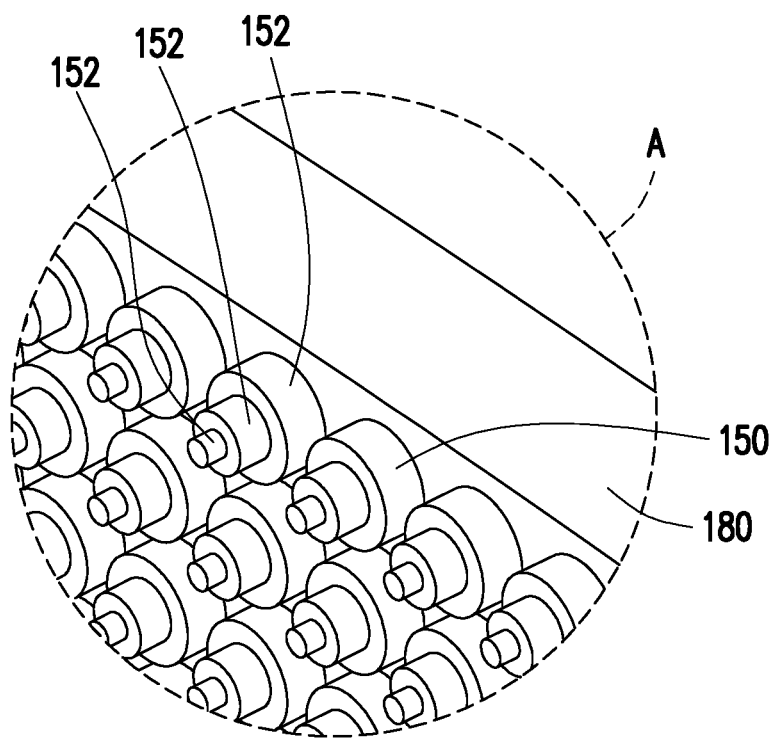
FIG. 5 is a partial enlarged view of a region A depicted in FIG. 4.
Figure 6:
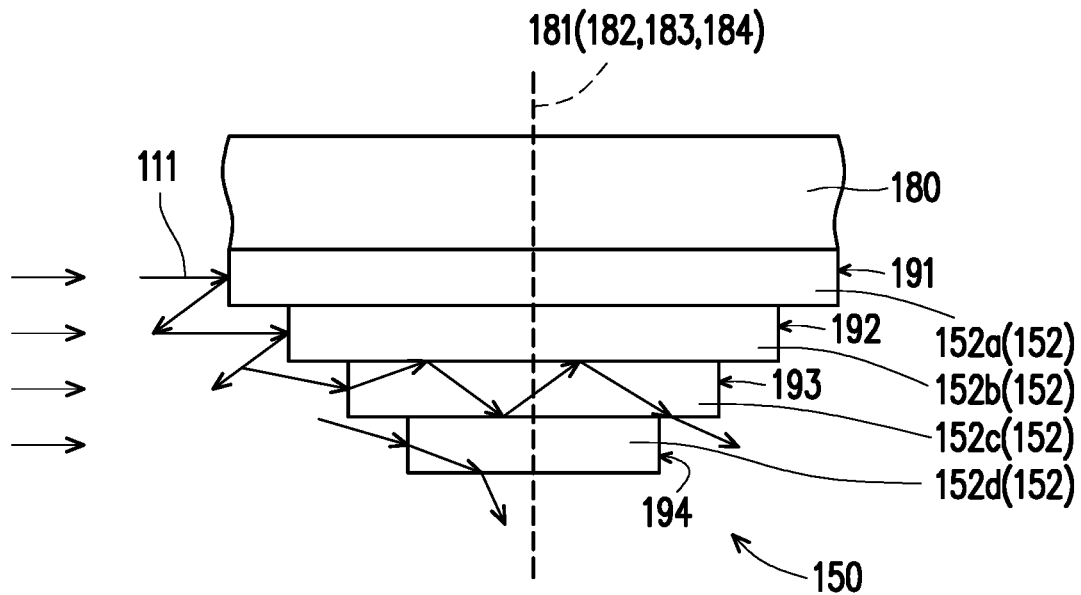
FIG. 6 is a schematic diagram illustrating an axisymmetric optical micro-structure according to an embodiment of the disclosure.
Figure 7:
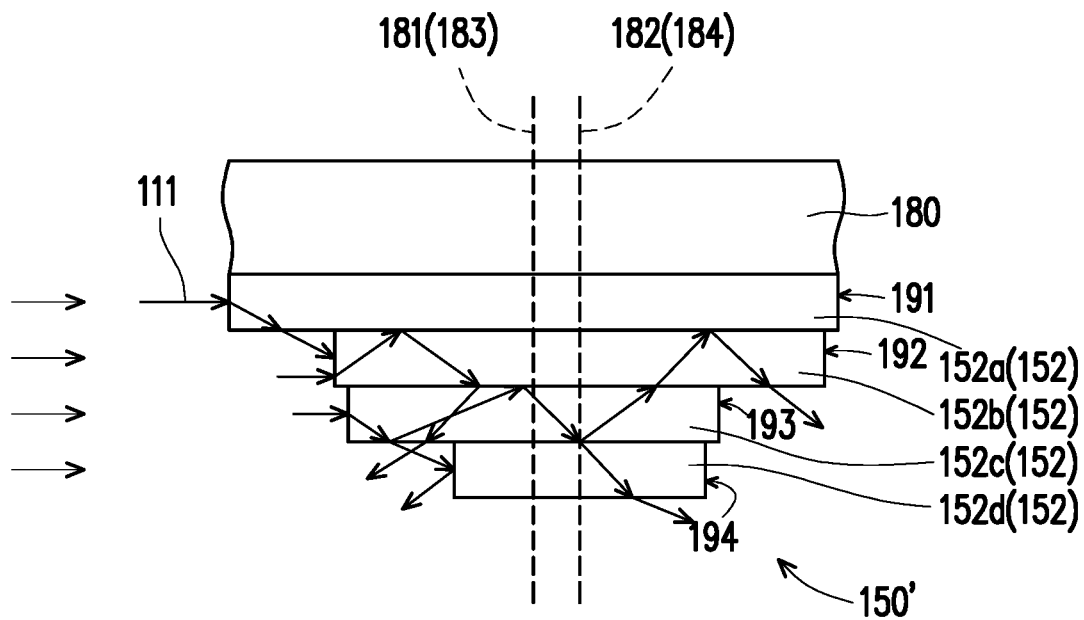
FIG. 7 is a schematic diagram illustrating a non-axisymmetric optical micro-structure according to an embodiment of the disclosure.

FIG. 4 is a schematic three-dimensional view illustrating the optical micro-structures in FIG. 1 and FIG. 2. FIG. 5 is a partial enlarged view of a region A depicted in FIG. 4. FIG. 6 is a schematic diagram illustrating an axisymmetric optical micro-structure according to an embodiment of the disclosure. FIG. 7 is a schematic diagram illustrating a non-axisymmetric optical micro-structure according to an embodiment of the disclosure. With reference to FIG. 4, FIG. 5, FIG. 6, and FIG. 7 together, each of the optical micro-structures 150 is a multilayer stair-structure. The multilayer stair-structure include a plurality of stacked layers 152, meaning that each of the optical micro-structures 150 includes plural stacked layers 152 (e.g., stacked layers 152a, 152b, 152c, and 152d in FIG. 6 and FIG. 7). In some embodiments, at least part of side surfaces 191, 192, 193, and 194 of the stacked layers 152a, 152b, 152c, and 152d are not aligned. Further, in another embodiment, the side surfaces 191, 192, 193, and 194 of the stacked layers 152a, 152b, 152c, and 152d are not aligned with each other. As shown in FIG. 6, central axes 181, 182, 183, and 184 of the stacked layers 152a, 152b, 152c, and 152d coincide with each other, so that the axisymmetric optical micro-structure 150 is formed.

To be specific, the stacked layers 152a, 152b, 152c, and 152d are disposed on a carrier 180 and are stacked from a side near the carrier 180 to a side far from the carrier 180. The carrier 180 is at least one of the reflective shell 120 and the front cover 130. That is, the carrier 180 is the reflective shell 120 for the optical micro-structures 150 disposed on the reflective shell 120, and the carrier 180 is the front cover 130 for the optical micro-structures 150 disposed on the front cover 130. For any two stacked layers 152 of each of the optical micro-structures 150, a distribution range of the stacked layer 152 closer to the carrier 180 is greater than and covers a distribution range of the stacked layer 152 farther from the carrier 180. For instance, a transverse (i.e., in a direction perpendicular to the central axis 181) distribution range of the stacked layer 152a is greater than and covers a transverse distribution range of the stacked layer 152b, the transverse distribution range of the stacked layer 152b is greater than and covers a transverse distribution range of the stacked layer 152c, and the transverse distribution range of the stacked layer 152c is greater than and covers a transverse distribution range of the stacked layer 152d. In this way, the multilayer stair-structure is stacked and formed.

To explain in another way, if the transverse distribution range of the stacked layer 152a is greater than the transverse distribution range of the stacked layer 152b, meaning that a transversely section area of the stacked layer 152a is greater than a transversely section area of the stacked layer 152b. If the transverse distribution range of the stacked layer 152a covers the transverse distribution range of the stacked layer 152b, meaning that the right side surface 192 of the stacked layer 152b does not protrude from the right side surface 191 of the stacked layer 152a, and the same is also applied to the left side.

Further, in another embodiment, an optical micro-structure 150' may be used to replace the optical micro-structure 150 as shown in FIG. 7. In the optical micro-structure 150', at least part of the central axes 181, 182, 183, and 184 of the plural stacked layers 152 (e.g., 152a, 152b, 152c, and 152d) do not coincide with each other, so that the non-axisymmetric optical micro-structure 150' is formed. Comparing to the axisymmetric optical micro-structure 150, the non-axisymmetric optical micro-structure 150' features a characteristic of generating a large-angle light shape, for example, a large-angle light shape with an divergence angle greater than 140 degrees. Hence, the problem of excessive concentration of light intensity may be addressed.

As described above, in the illumination apparatus 100 and the illumination apparatus 100' provided by the embodiments, the optical micro-structures 150 featuring the multilayer stair-structures or the optical micro-structures 150 featuring the stacked layers 152 with at least part of the side surfaces not being aligned are adopted. The optical micro-structures 150 may diffuse the light beam by refraction and reflection. Therefore, a light-emitting source area is increased, a smaller glare value is generated, and required illumination effect (for example, the road illumination light shape in compliance with traffic regulations) is achieved. In this way, pedestrians may feel more comfortable, and requirements of road regulations are not affected.

Note that the stacked layers 152 are circular disc-shaped, for example, or may be polygonal disc-shaped, geometrical disc-shaped, or irregular disc-shaped. As the light beam is refracted and reflected for multiple times between the stacked layers 152, uniformity of light intensity is thereby increased. The distribution of the optical micro-structures 150 on the reflective shell 120 and the front cover 130 may also be designed according to the required light shape. For instance, the non-axisymmetric optical micro-structures 150' are only adopted, and that the light shape featuring high level of surface uniformity is achieved. Alternatively, the axisymmetric optical micro-structures 150 are disposed at a central region centered on the central axis 160 of the front cover 130, and the non-axisymmetric optical micro-structures 150' are disposed at a peripheral region. In this way, the light shape featuring a higher level of central light intensity is achieved. Nevertheless, the invention should not be construed as limited thereto.

In view of the foregoing, in the illumination apparatus provided by the embodiments of the disclosure, the optical micro-structures featuring the multilayer stair-structures or the optical micro-structures featuring the stacked layers with at least part of the side surfaces not being aligned are adopted. Since the optical micro-structures may diffuse the light beam by refraction and reflection, glare is suppressed and required illumination effect is achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An illumination apparatus, comprising:
    a reflective shell;
    a front cover, connected to the reflective shell, wherein a containing space is formed between the reflective shell and the front cover;
    a light-emitting device, disposed in the containing space and configured to emit a light beam; and
    a plurality of optical micro-structures, disposed on at least one of the reflective shell and the front cover, each of the optical micro-structures being a multilayer stair-structure, the optical micro-structures diffusing the light beam by refraction and reflection.

2. The illumination apparatus as claimed in claim 1, wherein the multilayer stair-structure comprises a plurality of stacked layers, and central axes of the stacked layers coincide with each other.

3. The illumination apparatus as claimed in claim 1, wherein the multilayer stair-structures comprises a plurality of stacked layers, and central axes of some of the stacked layers do not coincide with central axes of other stacked layers.

4. The illumination apparatus as claimed in claim 1, wherein the multilayer stair-structure comprises a plurality of stacked layers disposed on a carrier and stacked from a side near the carrier to a side far from the carrier, the carrier is the at least one of the reflective shell and the front cover, and a distribution range of the stacked layer closer to the carrier is greater than and covers a distribution range of the stacked layer farther from the carrier for any two stacked layers of each of the optical micro-structures.

5. The illumination apparatus as claimed in claim 1, wherein the front cover is flat plate-shaped, convex lens-shaped, concave lens-shaped, or curved plate-shaped with a uniform thickness.

6. The illumination apparatus as claimed in claim 1, wherein the light-emitting device comprises:
    a light-emitting diode, configured for emitting the light beam; and
    a secondary lens, disposed on a transmission path of the light beam to increase a divergence angle of the light beam.

7. The illumination apparatus as claimed in claim 1, wherein the reflective shell comprises:
    a cover, having an inner surface facing the containing space and an outer surface facing away from the containing space; and
    a reflection layer, located on the inner surface.

8. The illumination apparatus as claimed in claim 1, wherein an included angle between an optical axis of the light-emitting device and a central axis of the front cover ranges from 20 degrees to 80 degrees.

9. The illumination apparatus as claimed in claim 1, wherein the illumination apparatus is a street light.

10. An illumination apparatus, comprising:
    a reflective shell;
    a front cover, connected to the reflective shell, wherein a containing space is formed between the reflective shell and the front cover;
    a light-emitting device, disposed in the containing space and configured to emit a light beam; and
    a plurality of optical micro-structures, disposed on at least one of the reflective shell and the front cover, each of the optical micro-structures comprising a plurality of stacked layers, at least part of side surfaces of the stacked layers being not aligned, and the optical micro-structures diffusing the light beam by refraction and reflection.

11. The illumination apparatus as claimed in claim 10, wherein the side surfaces of the stacked layers are not aligned with each other.

12. The illumination apparatus as claimed in claim 10, wherein central axes of the stacked layers coincide with each other.

13. The illumination apparatus as claimed in claim 10, wherein central axes of some of the stacked layers do not coincide with central axes of other stacked layers.

14. The illumination apparatus as claimed in claim 10, wherein the stacked layers are disposed on a carrier and are stacked from a side near the carrier to a side far from the carrier, the carrier is at least one of the reflective shell and the front cover, and a distribution range of the stacked layer closer to the carrier is greater than and covers a distribution range of the stacked layer farther from the carrier for any two stacked layers of each of the optical micro-structures.

15. The illumination apparatus as claimed in claim 10, wherein the front cover is flat plate-shaped, convex lens-shaped, concave lens-shaped, or curved plate-shaped with a uniform thickness.

16. The illumination apparatus as claimed in claim 10, wherein the light-emitting device comprises:

a light-emitting diode, configured for emitting the light beam; and a secondary lens, disposed on a transmission path of the light beam from the light-emitting diode to increase a divergence angle of the light beam.

17. The illumination apparatus as claimed in claim 10, wherein the reflective shell comprises:

a cover, having an inner surface facing the containing space and an outer surface facing away from the containing space; and a reflection layer, located on the inner surface.

18. The illumination apparatus as claimed in claim 10, wherein an included angle between an optical axis of the light-emitting device and a central axis of the front cover ranges from 20 degrees to 80 degrees.

19. The illumination apparatus as claimed in claim 10, wherein the illumination apparatus is a street light.

* * * * *